(12) United States Patent
Choi et al.

(10) Patent No.: US 12,491,733 B2
(45) Date of Patent: Dec. 9, 2025

(54) HALF SHAFT AND HUB BEARING ASSEMBLY

(71) Applicant: GM GLOBAL TECHNOLOGY OPERATIONS LLC, Detroit, MI (US)

(72) Inventors: Yoonjae Choi, Incheon (KR); Minseung Kim, Incheon (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 439 days.

(21) Appl. No.: 18/124,511

(22) Filed: Mar. 21, 2023

(65) Prior Publication Data
US 2024/0316987 A1   Sep. 26, 2024

(51) Int. Cl.
B60B 27/00 (2006.01)
F16D 3/22 (2006.01)
F16D 3/223 (2011.01)

(52) U.S. Cl.
CPC .......... B60B 27/0015 (2013.01); *F16D 3/22* (2013.01); *F16D 2003/22326* (2013.01); *F16D 2300/06* (2013.01)

(58) Field of Classification Search
CPC ............ B60B 27/0015; B60B 27/0021; B60B 27/0026; B60B 27/0036; B60B 27/0042; B60B 27/0073; B60B 2900/511; B60B 2900/5112; B60B 2900/5114; B60B 2900/5118; B60B 2900/561; F16D 3/223; F16D 2001/103; F16D 2003/22326; F16D 2300/06; Y10S 464/905; Y10S 464/904; Y10S 464/906; Y10T 403/7033

USPC .......... 403/359.5; 464/15, 16, 904, 905, 906
See application file for complete search history.

(56) References Cited

U.S. PATENT DOCUMENTS

| | | | |
|---|---|---|---|
| 5,607,241 A * | 3/1997 | Fukumura | F16D 3/223 384/537 |
| 6,648,518 B2 * | 11/2003 | Uchman | F16D 3/223 384/589 |
| 6,851,866 B2 * | 2/2005 | Kayama | F16D 3/223 384/589 |
| 6,902,325 B1 * | 6/2005 | Uchman | B60B 27/0042 464/178 |
| 8,591,118 B2 * | 11/2013 | Ishijima | B60B 27/0026 301/105.1 |
| 8,944,694 B2 * | 2/2015 | Fukumura | B60B 27/0042 384/589 |

(Continued)

FOREIGN PATENT DOCUMENTS

JP 2010158957 A * 7/2010 ............. F16D 1/108

*Primary Examiner* — Josh Skroupa

(57) ABSTRACT

A half shaft and hub bearing assembly includes a half shaft including a CV joint outer race and a stub axle extending from the CV joint outer race. The CV joint outer race includes a first axial face including an annular groove and the half shaft includes a first chamfered shoulder having a chamfer angle. A hub bearing includes a body having a bore therethrough that receives the stub axle. The body includes a second axial face opposing the first axial face of the CV joint outer race with a gap therebetween and a second chamfered shoulder engaging the first chamfered shoulder. The hub bearing includes a hub flange extending radially from the body. A seal ring is received in the annular groove in the first axial face of the CV joint outer race and the seal ring being disposed against the second axial face of the hub bearing.

20 Claims, 1 Drawing Sheet

(56) References Cited

U.S. PATENT DOCUMENTS

2025/0020173 A1* 1/2025 Alcantara .............. F16D 3/223

* cited by examiner

HALF SHAFT AND HUB BEARING ASSEMBLY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Constant-velocity joints (also known as CV joints) are mechanical joints which allow a drive shaft to transmit power through a variable angle, at constant rotational speed, without an appreciable increase in friction or play. They are mainly used in front-wheel drive vehicles. Modern rear-wheel drive cars with independent rear suspension typically use CV joints at the ends of the rear axle half shafts and increasingly use them on the drive shaft. The half shaft is typically connected to a hub bearing that is rotatably supported by the vehicle structure and is connected to a vehicle wheel.

The present disclosure relates to a haft shaft and hub bearing assembly for noise prevention.

SUMMARY

According to an aspect of the present disclosure, a half shaft and hub bearing assembly includes a half shaft including a CV joint outer race and a stub axle extending from the CV joint outer race. The CV joint outer race includes a first axial face including an annular groove and the half shaft includes a first chamfered shoulder having a chamfer angle. A hub bearing includes a body having a bore therethrough that receives the stub axle. The body includes a second axial face opposing the first axial face of the CV joint outer race with a gap therebetween and a second chamfered shoulder engaging the first chamfered shoulder. The hub bearing includes a hub flange extending radially from the body. A seal ring is received in the annular groove in the first axial face of the CV joint outer race and the seal ring being disposed against the second axial face of the hub bearing.

According to a further aspect, the stub axle includes a threaded end configured to receive a hub nut.

According to a further aspect, the seal ring is an O-ring.

According to a further aspect, the hub bearing includes an outer race surface.

According to a further aspect, a grease pocket is formed in the first chamfered shoulder.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 2:
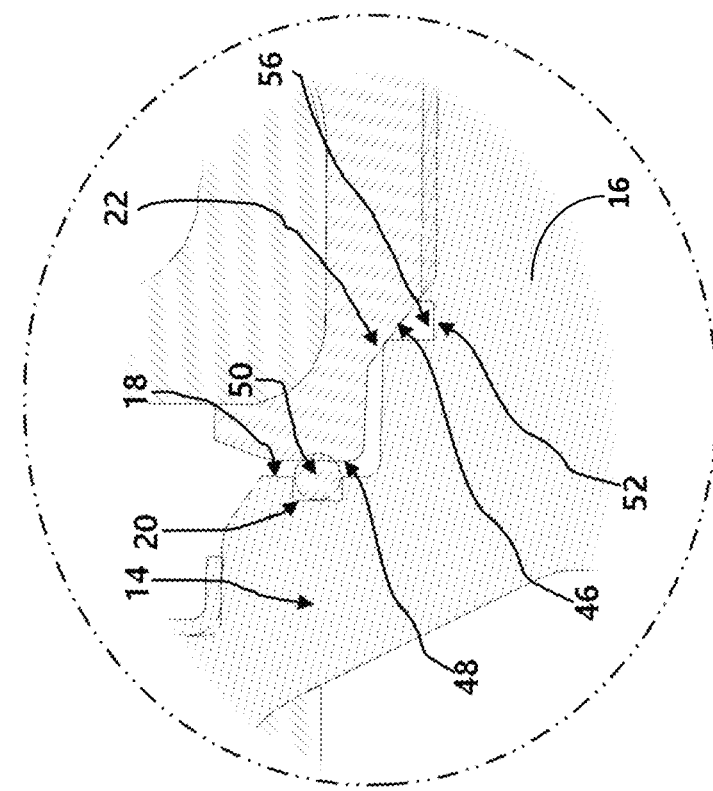
FIG. 2 is a detailed cross-sectional view of an interface between the half shaft and the hub bearing assembly according to the principles of the present disclosure.
Figure 1:
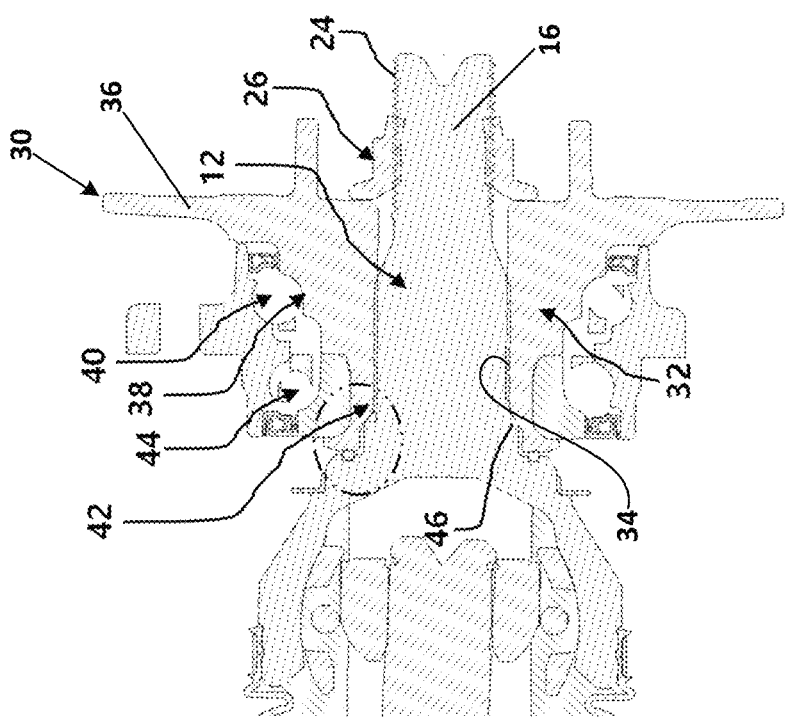
FIG. 1 is cross-sectional view of a half shaft and hub bearing assembly according to the principles of the present disclosure.

Referring now to FIG. 1, a cross-sectional view of a half shaft and a hub bearing assembly 10 is shown. The assembly 10 includes a half shaft 12 having a CV joint outer race 14 and a stub axle 16 extending in an axial direction from the CV joint outer race 14. With reference to FIGS. 1 and 2, the CV joint outer race 14 includes an axial face 18 that includes a recessed annular groove 20. The stub axle 16 includes an external chamfered shoulder 22 having a chamfer angle, relative to an axis of the stub axle 16 of between 30 and 60 degrees and more preferably about 45 degrees. By the word "about" it is intended to include a variance of +10%. The stub axle 16 can include a distal end with a threaded interface 24 for receiving a hub nut 26 thereon. The CV joint outer race 14 is designed to engage with axle bar shaft and inboard joint (not shown) as is known in the art.

The assembly 10 further includes a hub bearing 30 having an annular body 32 with an internally splined bore 34 therethrough. The hub bearing 30 includes a radially extending wheel mounting flange 36 having a plurality of apertures for mounting a wheel to the flange. The hub bearing 30 further includes a first race surface 38 that is configured to receive a first bearing assembly and a second race surface 42 that is configured to receive a second bearing assembly. The bore 34 of the hub bearing 30 includes an internal chamfered shoulder 46 that engages the external chamfered shoulder 22 of the stub axle. The internal chamfered shoulder 46 has a chamfer angle that matches the chamfer angle of the external chamfered shoulder 22 (between 30 and 60 degrees and more preferably about 45 degrees). The annular body 32 of the hub bearing 30 includes an axial face 48 that opposes the axial face 18 of the CV joint outer race 14. An O-ring 50 is received in the recessed annular groove 20 of the axial face 18 of the CV joint outer race 14 and is in engagement with the axial face 48 of the hub bearing 30. The engagement of the internal chamfered shoulder 46 and the external chamfered shoulder 22 maintain a gap space between the axial face 18 of the CV joint outer race 14 and the axial face 48 of the hub bearing 30.

The external chamfered shoulder 22 can include one or more grease pockets 52. In particular, a plurality of grease pockets 52 can be defined by a plurality of spaced recesses 54 in the chamfered shoulder 22. The spaced recesses 54 can be filled with grease 56. The grease pockets 52 can have a depth (relative to the chamfered shoulder) of between 1 and 4 mm and more preferably a depth of 3 mm. The grease pockets can further have a width (relative to a longitudinal direction) of between 2 and 3 mm and more preferably 2.5 mm.

In an assembled condition, the stub axle 16 is inserted into the bore 34 of the annular body 32 of the hub bearing 30, and there is a spline engagement between the stub axle 16 and the bore 34 of the annular body 32 of the hub bearing 30. The hub nut 26 can be threadedly engaged with the threaded interface 24 and disposed against the annular body 32 to secure the stub axle 16 within the bore 34. Grease 56 can be disposed in the spaced recesses 54 and the internal chamfered shoulder 46 is disposed against the external chamfered shoulder 22 of the stub axle 16. The axial face 48 of the hub bearing 30 opposes the axial face 18 of the CV joint outer race 14 and engages the O-ring 50 that is received in the annular groove 20. The gap between the axial face 48 of the hub bearing 30 and the axial face 18 of the CV joint outer race 14 eliminates noises caused by engagement between the hub bearing 30 and the CV joint outer race 14. The gap distance can be between 0.5 and 2 mm and more preferably, 1 mm. The O-ring 50 prevents contaminants or water from entering the gap between the axial face 48 of the hub bearing 30 and the axial face 18 of the CV joint outer race 14. The grease 56 further prevents noises from being created by the hub bearing 30 stub axle 16 interface. The engagement between the external chamfered shoulder 22 and the internal chamfered shoulder 46 receives the axial force due to nut tightening and minimizes the difference in torsional stiffness between the half shaft 12 and the hub bearing 30.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.).

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "and/or" includes any and all combinations of one or more of the associated listed items. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A half shaft and hub bearing assembly, comprising:
a half shaft including a CV joint outer race and a stub axle extending from the CV joint outer race, the CV joint outer race having a first axial face including an annular groove, the half shaft including a first chamfered shoulder having a chamfer angle;
a hub bearing including a body having a bore therethrough that receives the stub axle therein, the body including a second axial face opposing the first axial face of the CV joint outer race and a second chamfered shoulder engaging the first chamfered shoulder, the second axial face being spaced from the first axial face by a gap distance, the hub bearing including a hub flange extending radially from the body; and
a seal ring received in the annular groove in the first axial face of the CV joint outer race and the seal ring being disposed against the second axial face of the hub bearing.

2. The half shaft and hub bearing assembly according to claim 1, wherein the stub axle includes a threaded end configured to receive a hub nut.

3. The half shaft and hub bearing assembly according to claim 1, wherein the seal ring is an O-ring.

4. The half shaft and hub bearing assembly according to claim 1, wherein the hub bearing includes an outer race surface.

5. The half shaft and hub bearing assembly according to claim 1, further comprising at least one grease pocket formed in the first chamfered shoulder.

6. The half shaft and hub bearing assembly according to claim 1, wherein the first chamfered shoulder and the second chamfered shoulder have a chamfer angle relative to an axis of the half shaft of between 30 and 60 degrees.

7. The half shaft and hub bearing assembly according to claim 1, wherein the first chamfered shoulder and the second chamfered shoulder have a chamfer angle relative to an axis of the half shaft of 45 degrees.

8. A half shaft and hub bearing assembly, comprising:
a half shaft including a CV joint outer race and a stub axle extending from the CV joint outer race, the CV joint outer race includes a first axial face, the half shaft including a first chamfered shoulder having a chamfer angle;
a hub bearing including a body having a bore therethrough that receives the stub axle therein, the body including a second axial face opposing the first axial face of the CV joint outer race and a second chamfered shoulder engaging the first chamfered shoulder, the second axial face being spaced from the first axial face by a gap distance, the hub bearing including a hub flange extending radially from the body; and
a seal ring received between the first axial face of the CV joint outer race and the second axial face of the hub bearing.

9. The half shaft and hub bearing assembly according to claim 8, wherein the stub axle includes a threaded end configured to receive a hub nut.

10. The half shaft and hub bearing assembly according to claim 8, wherein the seal ring is an O-ring.

11. The half shaft and hub bearing assembly according to claim 8, wherein the hub bearing includes an outer race surface.

12. The half shaft and hub bearing assembly according to claim 8, further comprising at least one grease pocket formed in the first chamfered shoulder.

13. The half shaft and hub bearing assembly according to claim 8, wherein the first axial face of the CV joint outer race includes an annular groove that receives the seal ring therein.

14. The half shaft and hub bearing assembly according to claim 8, wherein the first chamfered shoulder and the second chamfered shoulder have a chamfer angle relative to an axis of the half shaft of between 30 and 60 degrees.

15. The half shaft and hub bearing assembly according to claim 8, wherein the first chamfered shoulder and the second chamfered shoulder have a chamfer angle relative to an axis of the half shaft of 45 degrees.

16. A half shaft and hub bearing assembly, comprising:
a half shaft including a CV joint outer race and a stub axle extending from the CV joint outer race, the CV joint outer race having a first axial face including an annular groove, the half shaft including a first chamfered shoulder having a chamfer angle, a grease pocket formed in the first chamfered shoulder;
a hub bearing including a body having a bore therethrough that receives the stub axle therein, the body including a second axial face opposing the first axial face of the CV joint outer race and a second chamfered shoulder engaging the first chamfered shoulder, the second axial face being spaced from the first axial face by a gap distance, the hub bearing including a hub flange extending radially from the body; and
a seal ring received in the annular groove in the first axial face of the CV joint outer race and the seal ring being disposed against the second axial face of the hub bearing.

17. The half shaft and hub bearing assembly according to claim 16, wherein the stub axle includes a threaded end configured to receive a hub nut.

18. The half shaft and hub bearing assembly according to claim 16, wherein the seal ring is an O-ring.

19. The half shaft and hub bearing assembly according to claim 16, wherein the hub bearing includes an outer race surface.

20. The half shaft and hub bearing assembly according to claim 16, wherein the first chamfered shoulder and the second chamfered shoulder have a chamfer angle relative to an axis of the half shaft of between 30 and 60 degrees.

* * * * *